United States Patent
Mori

(10) Patent No.: US 9,667,876 B2
(45) Date of Patent: May 30, 2017

(54) IMAGE CAPTURING APPARATUS AND CONTROL METHOD OF THE SAME

(71) Applicant: CANON KABUSHIKI KAISHA, Tokyo (JP)

(72) Inventor: Naomi Mori, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 5 days.

(21) Appl. No.: 14/851,776

(22) Filed: Sep. 11, 2015

(65) Prior Publication Data

US 2016/0080624 A1    Mar. 17, 2016

(30) Foreign Application Priority Data

Sep. 12, 2014   (JP) ................................ 2014-187033

(51) Int. Cl.
  *H04N 5/235*    (2006.01)
  *H04N 5/378*    (2011.01)

(52) U.S. Cl.
  CPC ......... *H04N 5/2351* (2013.01); *H04N 5/2352* (2013.01); *H04N 5/2353* (2013.01); *H04N 5/378* (2013.01)

(58) Field of Classification Search
  CPC .... H04N 5/235; H04N 5/2351; H04N 5/2352; H04N 5/2353; H04N 5/378
  See application file for complete search history.

(56) References Cited

U.S. PATENT DOCUMENTS

| | | | | |
|---|---|---|---|---|
| 2008/0062284 A1* | 3/2008 | Fujio | ...................... | G03B 7/003 348/235 |
| 2010/0033602 A1* | 2/2010 | Okada | .................... | H04N 5/232 348/241 |
| 2010/0079617 A1* | 4/2010 | Kosaka | .............. | H04N 5/23219 348/229.1 |
| 2012/0269501 A1* | 10/2012 | Yamamoto | ........... | H04N 5/2353 396/238 |
| 2013/0064533 A1* | 3/2013 | Nakata | ..................... | G03B 3/10 396/76 |
| 2015/0026632 A1* | 1/2015 | Wakabayashi | ..... | H04N 5/23209 715/776 |
| 2016/0077656 A1* | 3/2016 | Ito | ........................ | G06F 3/0416 345/173 |

FOREIGN PATENT DOCUMENTS

JP    2005-303407 A    10/2005
JP    2005303407 A  *  10/2005

* cited by examiner

*Primary Examiner* — Abdelaaziz Tissire
(74) *Attorney, Agent, or Firm* — Cowan, Liebowitz & Latman, P.C.

(57) ABSTRACT

An image capturing apparatus comprises an image capture unit, a setting unit configured to set a sensitivity serving as a setting for shooting using the image capture unit, and a selection unit configured to be able to select one of a first selection method capable of selecting a sensitivity from out of a plurality of sensitivities at a first numerical value increment, and a second selection method capable of selecting a sensitivity from out of a plurality of sensitivities at a second numerical value increment, as a method for selecting the sensitivity, the second numerical value being smaller than the first numerical value. Options selectable with the first selection method include a predetermined sensitivity that does not correspond to the first numerical value increment and is selectable with the second selection method.

10 Claims, 12 Drawing Sheets

FIG. 4A

OPTIONS FOR
1/3 STEP SETTING

| No. | ISO VALUE |
|---|---|
| 0 | AUTO |
| 1 | 100 |
| 2 | 125 |
| 3 | 160 |
| 4 | 200 |
| 5 | 250 |
| 6 | 320 |
| 7 | 400 |
| 8 | 500 |
| 9 | 640 |
| 10 | 800 |
| 11 | 1000 |
| 12 | 1250 |
| 13 | 1600 |
| 14 | 2000 |
| 15 | 2500 |
| 16 | 3200 |
| 17 | 4000 |
| 18 | 5000 |
| 19 | 6400 |
| 20 | 8000 |
| 21 | 10000 |
| 22 | 12800 |
| 23 | 16000 |
| 24 | H1(25600) |
| 25 | H2(51200) |

FIG. 4B

OPTIONS FOR
1 STEP SETTING

| No. | ISO VALUE |
|---|---|
| 0 | AUTO |
| 1 | 100 |
| 2 | 200 |
| 3 | 400 |
| 4 | 800 |
| 5 | 1600 |
| 6 | 3200 |
| 7 | 6400 |
| 8 | 12800 |
| 9 | 16000 |
| 10 | H1(25600) |
| 11 | H2(51200) |

FIG. 4C

ALL OPTIONS

| No. | ISO VALUE |
|---|---|
| 0 | AUTO |
| 1 | 100 |
| 2 | 125 |
| 3 | 160 |
| 4 | 200 |
| 5 | 250 |
| 6 | 320 |
| 7 | 400 |
| 8 | 500 |
| 9 | 640 |
| 10 | 800 |
| 11 | 1000 |
| 12 | 1250 |
| 13 | 1600 |
| 14 | 2000 |
| 15 | 2500 |
| 16 | 3200 |
| 17 | 4000 |
| 18 | 5000 |
| 19 | 6400 |
| 20 | 8000 |
| 21 | 10000 |
| 22 | 12800 |
| 23 | 16000 |
| 24 | H1(25600) |
| 25 | H2(51200) |

FIG. 4D

OPTIONS FOR ISO SENSITIVITY SETTING RANGE

| No. | ISO VALUE |
|---|---|
| 0 | 100 |
| 1 | 200 |
| 2 | 400 |
| 3 | 800 |
| 4 | 1600 |
| 5 | 3200 |
| 6 | 6400 |
| 7 | 12800 |
| 8 | 16000 |
| 9 | H1(25600) |
| 10 | H2(51200) |

FIG. 4E

OPTIONS ISO-AUTO RANGE

| No. | ISO VALUE |
|---|---|
| 0 | 100 |
| 1 | 200 |
| 2 | 400 |
| 3 | 800 |
| 4 | 1600 |
| 5 | 3200 |
| 6 | 6400 |
| 7 | 12800 |
| 8 | 16000 |

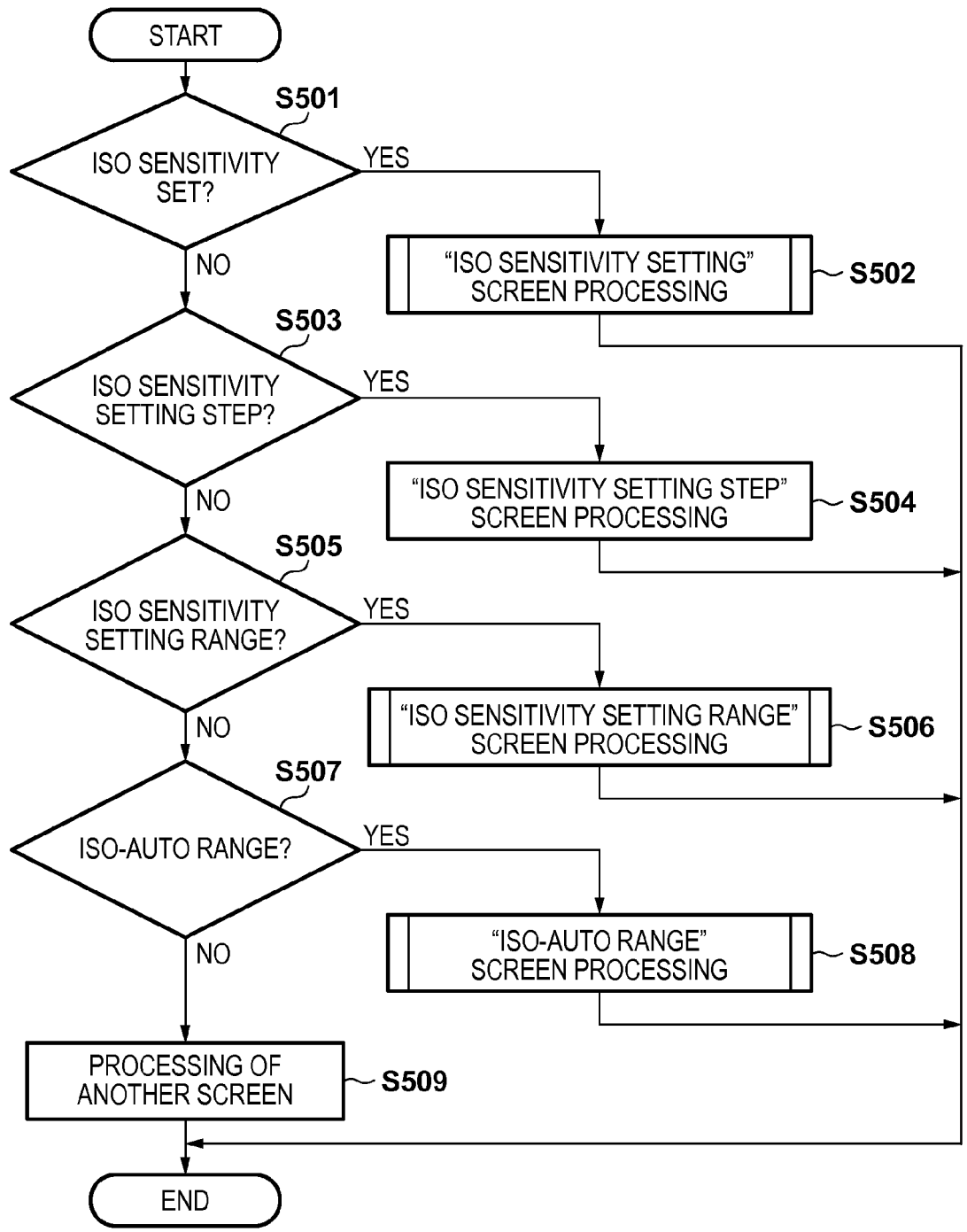

F I G. 11C

ISO SENSITIVITY SETTING STEP

1/3 STEP
1 STEP 1131
1132
1121
1122

F I G. 11B

ISO SENSITIVITY

AUTO [100] 125 160 200 250 320
400 500 640 800 1000 1250 1600
2000 2500 3200 4000 5000 6400 8000
10000 12800 16000 H1(25600) H2(51200)

F I G. 11E

ISO-AUTO RANGE

LOWER LIMIT VALUE  UPPER LIMIT VALUE
100                6400
1151               1152

OK      CANCEL
1153    1154

F I G. 11A

ISO SENSITIVITY

AUTO [100] 125 160 200 250 320
400 500 640 800 1000 1250 1600
2000 2500 3200 4000 5000 6400 8000
10000 12800 16000 H1(25600) H2(51200)

F I G. 11D

ISO SENSITIVITY SETTING RANGE

LOWER LIMIT VALUE  UPPER LIMIT VALUE
100                16000
1141               1142

OK      CANCEL
1143    1144

IMAGE CAPTURING APPARATUS AND CONTROL METHOD OF THE SAME

BACKGROUND OF THE INVENTION

Field of the Invention

The present invention relates to an ISO sensitivity setting method for an image capturing apparatus.

Description of the Related Art

Conventionally, image capturing apparatuses have been realized according to which it is possible to set ISO sensitivity setting options to options that match a user's shooting style by switching the ISO sensitivity step number setting in an image capturing apparatus such as a digital camera (Japanese Patent Laid-Open No. 2005-303407).

Since an unintended image, such as an image that appears to have a lower resolution, is shot in some cases when the user sets the ISO sensitivity, a recommended ISO sensitivity setting range (ISO sensitivity normal setting range) is presented to the user. In such a case, the upper limit value or the lower limit value of the ISO sensitivity normal setting range does not exist in the ISO sensitivity options with the step number setting selected by the user, and therefore the user needs to change the ISO sensitivity step number setting in order to perform setting to the upper limit value or the lower limit value of the ISO sensitivity normal setting range.

SUMMARY OF THE INVENTION

The present invention has been made in consideration of the aforementioned problems, and realizes a technique for enabling a user to easily perform setting to a desired ISO sensitivity, regardless of the ISO sensitivity step number setting.

In order to solve the aforementioned problems, the present invention provides an image capturing apparatus comprising: an image capture unit; a setting unit configured to set a sensitivity serving as a setting for shooting using the image capture unit; and a selection unit configured to be able to select one of a first selection method capable of selecting a sensitivity from out of a plurality of sensitivities at a first numerical value increment, and a second selection method capable of selecting a sensitivity from out of a plurality of sensitivities at a second numerical value increment, as a method for selecting the sensitivity, the second numerical value being smaller than the first numerical value, wherein options selectable with the first selection method include a predetermined sensitivity that does not correspond to the first numerical value increment and is selectable with the second selection method.

In order to solve the aforementioned problems, the present invention provides a control method of an image capturing apparatus comprising: a setting step of setting a sensitivity serving as a setting for shooting using the image capture unit; and a selection step of being able to select one of a first selection method capable of selecting a sensitivity from out of a plurality of sensitivities at a first numerical value increment, and a second selection method capable of selecting a sensitivity from out of a plurality of sensitivities at a second numerical value increment, as a method for selecting the sensitivity, the second numerical value being smaller than the first numerical value, wherein options selectable with the first selection method include a predetermined sensitivity that does not correspond to the first numerical value increment and is selectable with the second selection method.

According to the present invention, it is possible for a user to more easily perform setting to a desired ISO sensitivity, regardless of the ISO sensitivity step number setting.

Further features of the present invention will become apparent from the following description of exemplary embodiments with reference to the attached drawings.

BRIEF DESCRIPTION OF THE DRAWINGS

FIGS. 4A to 4E are diagrams illustrating management data for setting values of the ISO sensitivity.

FIG. 5 is a flowchart showing processing for setting the ISO sensitivity using a menu screen.

FIGS. 11A to 11E are diagrams showing an ISO sensitivity setting screen.

DESCRIPTION OF THE EMBODIMENTS

Embodiments upon application of the present invention to an image capturing apparatus such as a digital single-lens reflex camera for shooting a still image and/or moving image will be described in detail hereinafter with reference to the drawings.

Apparatus Configuration

The configuration and functions of a digital camera according to the present embodiment will be described below with reference to FIGS. 1 to 3.

The external configuration of the digital camera according to the present embodiment will be described first with reference to FIG. 1.

Figure 1:
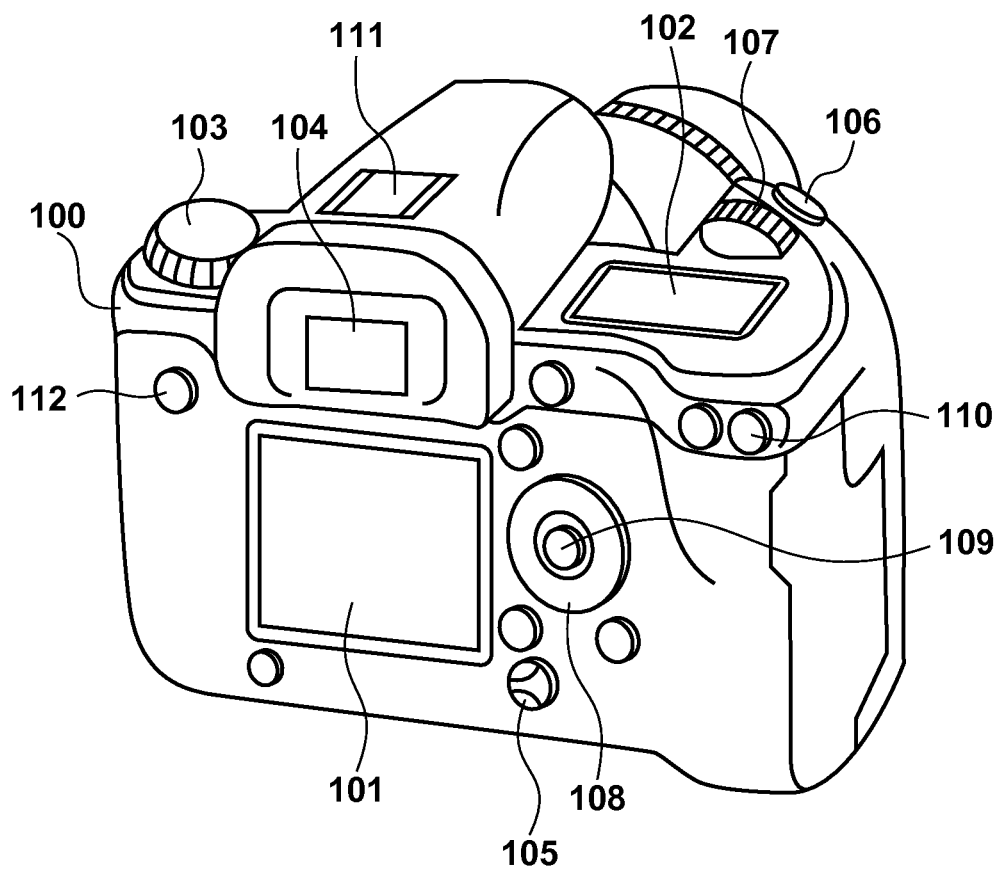
FIG. 1 is an external view of an image capturing apparatus according to an embodiment.

In FIG. 1, a display panel 102, a shooting mode dial 103, an optical viewfinder 104, a shutter button 106, a main electronic dial 107, and an accessory shoe 111 are arranged on a top surface of a camera body 100.

A liquid crystal display is used as the display panel 102. The display panel 102 displays setting information such as shutter speed, f-number, exposure level, ISO sensitivity, possible number of shooting images, remaining battery level, shooting mode, shooting condition and the like.

A shooting mode dial 103 is constituted by a rotary dial switch, and is an operation member for switching the shooting mode of the camera by the user.

The user can shoot an image by looking into the optical viewfinder 104 without viewing an image displayed as a through-the-lens image on the LCD monitor as an electronic view finder.

The shutter button 106 is a push-button switch for a user performing a shooting instruction.

A main electronic dial 107 is a rotatable operation member, and is arranged on a front surface side of the camera body 100. The main electronic dial 107 is capable of changing a shutter speed, f-number, or the like by the user directly operating it. Also, the main electronic dial 107 is capable of inputting a numerical value regarding a shooting operation and changing a shooting condition by operating it together with another operation member.

An accessory shoe 111 is a connector for connecting an accessory such as an external flash 400 (see FIG. 3) to the camera body 100.

A LCD monitor 101, a power switch 105, a sub-electronic dial 108, a SET button 109, a menu button 112, and operation members such as a cross-key and multi-controller (not shown) are arranged on a rear surface of the camera body 100.

A transmission type LCD which includes a backlight 120 is used as the LCD monitor 101. The LCD monitor 101 displays a captured image, image to be reproduced or User Interface (UI) screen for performing various settings. Note that the LCD monitor 101 is used to display a menu screen for instructing and inputting various settings, processes, and the like in the camera, and screens for setting values regarding ISO sensitivity (to be described later in FIGS. 11A to 11E).

The power switch 105 is an operation member for switching the camera body 100 between power ON and power OFF.

The sub-electronic dial 108 is capable of changing a shutter speed, f-number, or the like by the user directly operating it, similar to the main electronic dial 107. Also, the sub-electronic dial 108 is capable of inputting a numerical value regarding a shooting operation and changing a shooting condition by operating it together with another operation member.

The SET button 109 is used for an operation for a finalization of various settings and input selections on the menu screen and the like.

A mode switching button 110 is an operation member for switching the operation mode of the camera by the user.

The menu button 112 is an operation member for a user to instruct a system control unit 350 to start/end a display of the menu screen on the LCD monitor 101.

Figure 2:
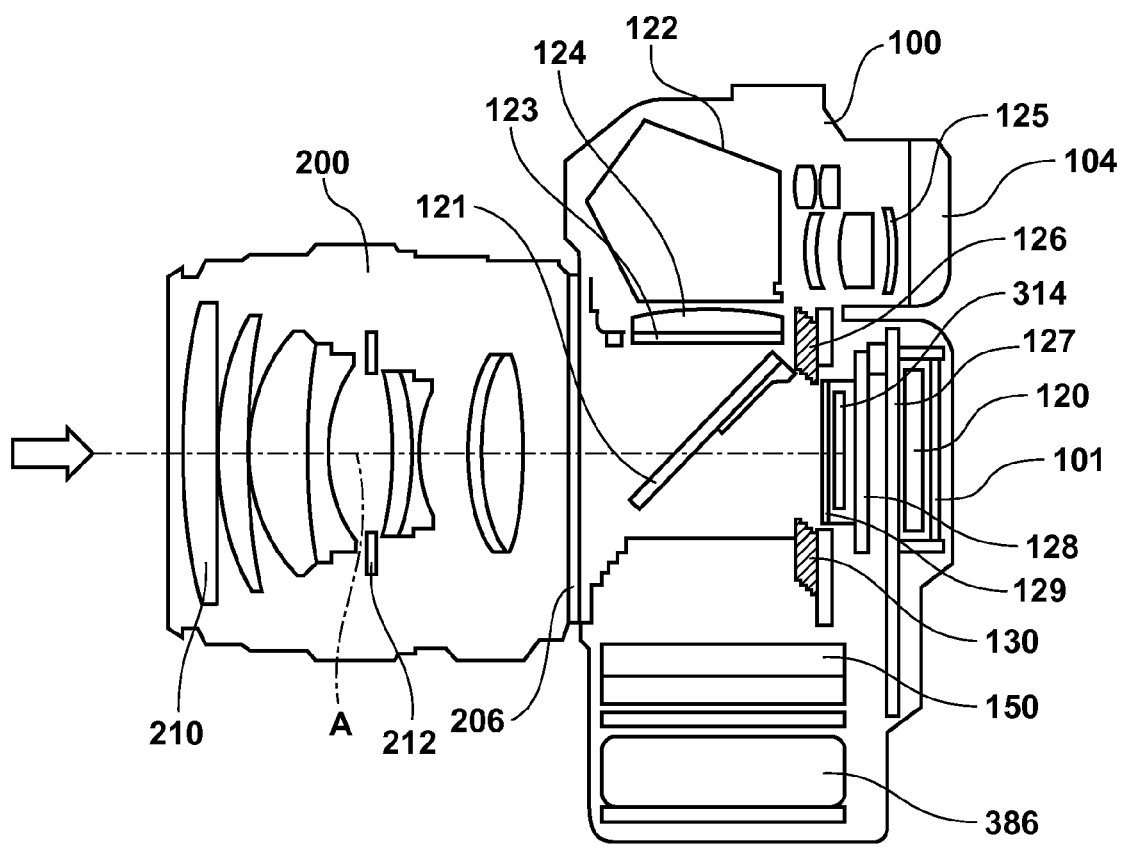
FIG. 2 is a diagram showing a mechanical configuration of the interior of the image capturing apparatus according to an embodiment.

As shown in FIG. 2, an exchangeable lens (lens unit hereinafter) 200 is detachably arranged on a front surface of the camera body 100.

The lens unit 200 is attached to the camera body 100 such that an optical axis A of the lens unit 200 coincides with an optical axis of the camera body 100, and has a lens mount 206, an optical lens 210, and an aperture 212. The lens mount 206 is a member for mechanically coupling the lens unit 200 to the camera body 100. The lens mount 206 and camera mount 113 of the camera body 100 (to be described later) have a shape such as a flange that enables being coupled together. The lens unit 200 is attached to the camera body 100 by the lens mount 206 and camera mount 113 being coupled.

Inside the camera body 100, a mirror 121 is arranged in the imaging optical path. The mirror 121 is movable between a position (position shown in FIG. 2) where the mirror 121 reflects object light incoming from the optical lens 210 to the optical viewfinder system, and a position where it retracts out of the imaging optical path. Object light reflected by the mirror 121 forms an object image on a focusing plate 123.

A condenser lens 124 improves the visibility of the viewfinder. A pentagonal roof prism 122 guides object light that has passed through the focusing plate 123 and condenser lens 124 to an eyepiece lens 125. The optical viewfinder 104 is constituted by the focusing plate 123, condenser lens 124, and eyepiece lens 125. The user can observe an object image formed on the focusing plate 123 through the eyepiece lens 125.

Figure 3:
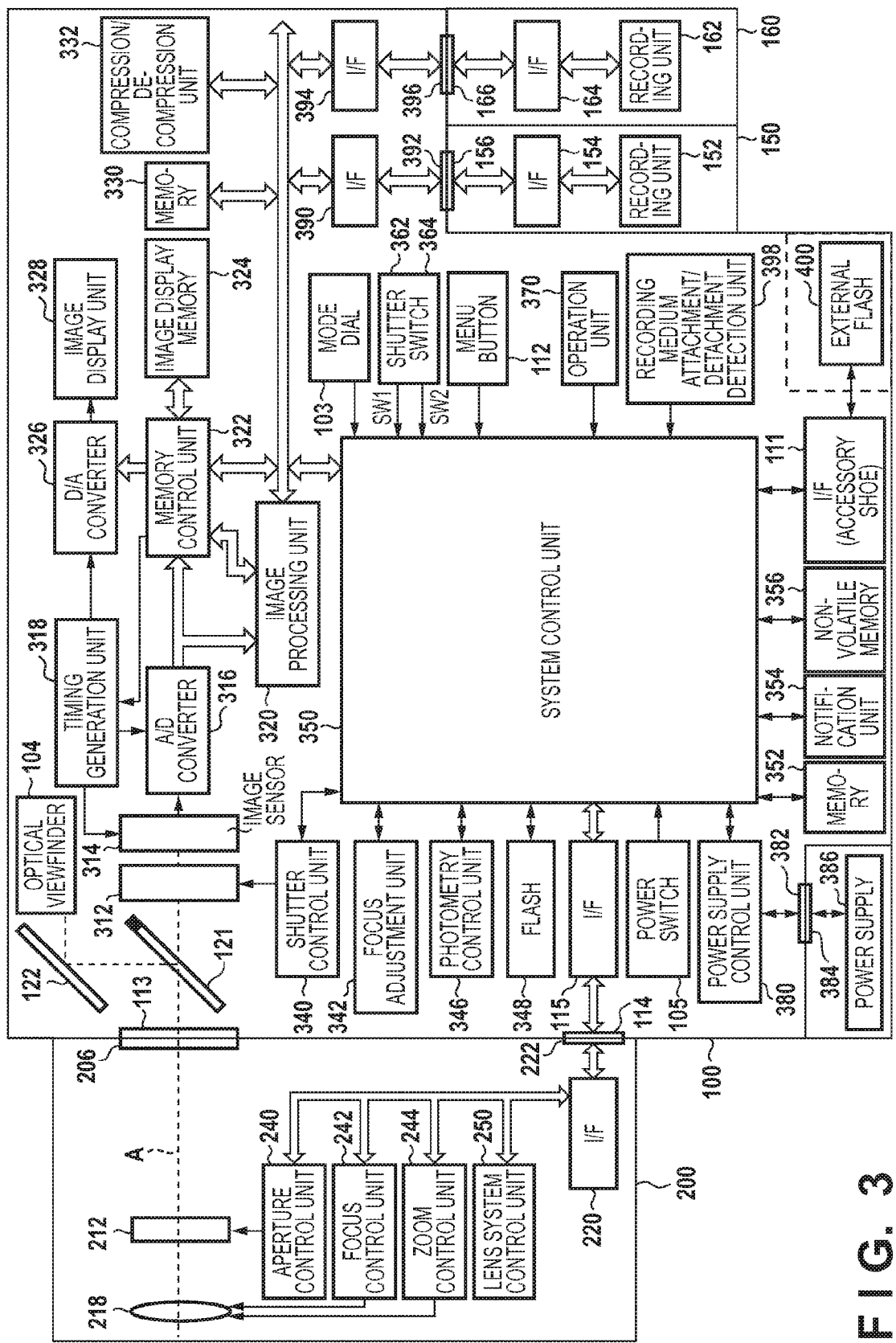
FIG. 3 is a block diagram showing an electrical configuration of the interior of the image capturing apparatus according to an embodiment.

A rear curtain 126 and a front curtain 130 form a focal plane shutter 312 (see FIG. 3). By controlling opening timings of the rear curtain 126 and the front curtain 130, an image sensor 314 is exposed for a necessary time. The image sensor 314 is constituted by a CCD sensor or CMOS sensor, and an optical low-pass filter 129 is arranged in front of the image sensor 314.

The image sensor 314 is also connected to a printed-circuit board 128. A display-circuit board 127 is arranged behind the printed-circuit board 128.

A recording medium 150 records image data obtained by shooting processing, and is constituted by a semiconductor memory, hard disk, or the like. An attachment device 160 is a personal computer and the like. Reference numeral 386 denotes power supply such as a secondary battery. The recording medium 150, the attachment device 160, and power supply 386 are detachable from the camera body 100.

The electrical configuration of the camera body 100 and the lens unit 200 will be described below with reference to FIG. 3.

In FIG. 3, the same reference numerals as those in FIGS. 1 and 2 denote the same elements as those in FIGS. 1 and 2.

As shown in FIG. 3, the digital camera of the present invention has the camera body 100, the recording medium 150, the attachment device 160, and the lens unit 200.

The internal configuration of the lens unit 200 will be described first.

The lens unit 200 includes a connector 222 and interface 220 for electrically connecting the lens unit 200 to the camera body 100. The connector 222 and interface 220 enable communication between a lens system control unit 250 (to be described later) and the system control unit 350 of the camera body 100 via a connector 114 and interface 115 of the camera body 100.

An aperture control unit 240 controls the aperture 212. The aperture control unit 240 controls the aperture 212 based on photometry information from a photometry control unit 346 (to be described later) while cooperating with a shutter control unit 340. A focus control unit 242 controls the focusing operation of the optical lens 210. A zoom control unit 244 controls the zooming operation of the optical lens 210.

The lens system control unit 250 overall controls various operations of the lens unit 200. The lens system control unit 250 includes a memory for storing constants, variables, software programs and the like for various operations.

Next, the internal configuration of the camera body 100 will be described.

Object light that has passed through the optical lens 210 and aperture 212 passes through the opened focal plane shutter 312 and enters into the image sensor 314 while the mirror 121 retracts out of the imaging optical path (if the mirror 121 is a half-mirror, it remains inside the imaging optical path). The image sensor 314 photo-electrically converts the incident object light and outputs it as an analog image signal.

An A/D converter 316 converts an analog signal (image signal) output from the image sensor 314 into a digital signal. A timing generator 318 supplies clock signals and control signals to the image sensor 314, the A/D converter 316, and a D/A converter 326 under the control of a memory control unit 322 and the system control unit 350.

An image processing unit 320 performs pixel interpolation processing and color conversion processing for image data from the A/D converter 316 or image data from the memory control unit 322. Also, the image processing unit 320 performs predetermined calculation processing using image data output from the A/D converter 316. Based on the calculation result, the system control unit 350 performs automatic focus processing (AF), automatic exposure processing (AE), and flash pre-emission processing (EF) of TTL type to control the shutter control unit 340 and a focus adjustment unit 342.

Furthermore, the image processing unit 320 also performs a predetermined calculation processing using image data output from the A/D converter 316, and performs automatic white balance (AWB) processing of TTL type based on the calculation results.

The memory control unit 322 controls the A/D converter 316, the timing generator 318, the image processing unit 320, an image display memory 324, the D/A converter 326, a memory 330, and a compression/decompression unit 332. Image data output from the A/D converter 316 is written in the image display memory 324 or memory 330 via the image processing unit 320 and memory control unit 322 or via only the memory control unit 322.

An image display unit 328 realizes an electronic viewfinder (EVF) function by sequentially displaying, on the LCD monitor 101 shown in FIGS. 1 and 2, image signals which have been converted into analog signals by the D/A converter 326 and written in the image display memory 324. Note that the image display unit 328 enables/disables the electronic viewfinder (EVF) function in accordance with an instruction from the system control unit 350.

The memory 330 stores captured still images. The memory 330 is used as a frame buffer for continuously writing images at a predetermined rate on the recording medium 150 during moving image shooting. The memory 330 is also used as a work area of the system control unit 350.

The compression/decompression unit 332 compresses/decompresses image data using a known image compression method. The compression/decompression unit 332 reads an image stored in the memory 330, compresses or decompresses it, and writes the processed data again in the memory 330.

The shutter control unit 340 controls the shutter speed of the focal plane shutter 312 based on photometry information from the photometry control unit 346 while cooperating with the aperture control unit 240 of the lens unit 200.

The focus adjustment unit 342 performs AF (Automatic Focus) processing by detecting the phase difference of an object image which has been guided by a sub-mirror (not shown) after passing through the mirror 121. The photometry control unit 346 performs AE (Automatic Exposure) processing based on an output signal from a photometry sensor (not shown).

An electronic flash 348 has an AF auxiliary light projecting function and electronic flash control function. Note that the photometry control unit 346 performs EF (Electronic Flash control) processing in cooperation with the electronic flash 348.

The system control unit 350 includes a CPU and memory, and overall controls operations of the camera body 100. A memory 352 stores constants, variables, and the software programs (basic programs) for operation of the system control unit 350. The memory 352 also stores values relating to ISO sensitivity (to be described later in FIGS. 4A to 4E).

A notification unit 354 notifies the outside of an operation state of a camera, a message, and the like by displaying text or an image using the LCD monitor 101, LED lamp, or the like, and generating sound from a loudspeaker (not shown) in accordance with execution of the software program by the system control unit 350. The notification unit 354 includes an LCD panel for displaying f-number, shutter speed, ISO sensitivity, focusing state, camera shake warning, exposure correction value, and the like within the optical viewfinder 104.

A nonvolatile memory 356 is constituted by, for example, an EEPROM, which is electrically erasable and recordable, and is used as a memory for storing software programs and the like. In this case, software programs are computer-readably stored in the nonvolatile memory 356, as a matter of course. The software programs include software programs executable for the system control unit 350 (to be described later in FIGS. 5 to 10). The nonvolatile memory 356 also stores setting values set on a GUI screen such as the menu screen, setting values set by operating the main electronic dial 107 and sub-electronic dial 108, shooting mode information designated by operating the shooting mode dial 103, and the like. The nonvolatile memory 356 also stores setting values of ISO sensitivity (to be described later in FIGS. 4A to 4E).

A shutter switch (SW1) 362 is turned on by the first stroke operation (pressed half-way) of the shutter button 106, and instructs the system control unit 350 of the start of an operation such as AF processing, AE processing, AWB processing, or EF processing. A shutter switch (SW2) 364 is turned on by the second stroke operation (pressed fully) of the shutter button 106, and instructs the system control unit 350 of the start of a series of shooting processing including exposure processing, development processing, and recording processing.

Operation units 370 comprise operation members such as various switches, buttons and a touch panel that accept various operations by the user. The system control unit 350 performs various operations based upon a signal from the operation unit 370. When the menu button 112 included among the operation units 370 is pressed, menu screen, which is capable of setting ISO sensitivity (to be described later) is displayed on the LCD monitor 101. The user can make various settings intuitively by using the menu screen (see FIGS. 11A to 11E), which is displayed on the LCD monitor 101, four-direction (up, down, left, right) buttons of the sub-electronic dial 108 and the SET button 109.

The power switch 105 switches between power on and power off of the camera body 100. The power switch 105 can simultaneously switch between power on and power off of the lens unit 200, an external flash 400, the recording medium 150, and the attachment device 160 which are connected to the camera body 100.

A power control unit 380 is constituted by, for example, a battery detection circuit, a DC/DC converter, and a switch circuit for switching the block to be supplied with power, and detects whether a battery has been inserted or not, the type of the battery, and the remaining battery level. Further, the power control unit 380 controls the DC-DC converter in accordance with the detection results and an instruction of the system control unit 350, and supplies a necessary voltage for a necessary length of time to each of the units including the recording medium 150.

Connectors 382 and 384 supply power from a power supply 386 such as the secondary battery to the camera body 100, the lens unit 200, the recording medium 150, and the attachment device 160. Reference numerals 390 and 394 denote interfaces with the recording medium 150 and the attachment device 160; and 392 and 396, connectors to connect the recording medium 150 and the attachment device 160. An attachment/detachment detection unit 398 detects whether the recording medium 150 and the attachment device 160 are connected to the connectors 392 and 396.

ISO Sensitivity Setting

Next, a configuration of management data for ISO sensitivity setting values that can be set using the digital camera of the present embodiment will be described with reference to FIGS. 4A to 4E.

The digital camera of the present embodiment is assumed to have an ISO sensitivity normal sensitivity setting range of 100 to 16000, and expanded sensitivity values H1(25600) and H2(51200).

FIGS. 4A to 4E show management data indicating ranges of possible ISO sensitivity settings, "No." indicating serial numbers, and "ISO sensitivity setting range" indicating values of ISO sensitivity options that can be set using the digital camera of the present embodiment.

FIG. 4A illustrates by an example ISO sensitivity options (at a second numerical value increment) that can be set in the case where the ISO sensitivity step number is set to one-third step (set using a one-third step ISO sensitivity setting screen described later in FIG. 11A). Aside from the ISO sensitivity setting value, the management data shown in FIG. 4A is also used to decide on an option in the case of ISO-AUTO, according to which the ISO sensitivity is automatically set when the shutter button 106 is half-pressed.

FIG. 4B illustrates by an example ISO sensitivity options (at a first numerical value increment) that can be set in the case where the ISO sensitivity step number is set to one step (set using a one step ISO setting screen described later with reference to FIG. 11B). Aside from the normal ISO values in the case of the one step setting and the expanded values, the management data shown in FIG. 4B includes ISO 16000, which is the upper limit of the normal setting range in the case of the one-third step setting, is furthermore included in the management data shown in FIG. 4B. Aside from determining the setting value for the ISO sensitivity, the management data shown in FIG. 4B is also used to determine options in the case of ISO-AUTO, according to which the ISO sensitivity is automatically set when the shutter button 106 is half-pressed.

FIG. 4C illustrates by an example all ISO sensitivity options that can be set in cases where the ISO sensitivities correspond to one-third step and one step.

FIG. 4D illustrates by an example ISO sensitivity options that can be set using the ISO sensitivity setting range screen, which will be described later with reference to FIG. 11D. The options of the ISO sensitivity setting range are values at a first numerical value increment corresponding to a normal setting range in the case of the one step setting, and expanded values, but in the present embodiment, as shown in FIG. 4B, ISO 16000, which does not correspond to a one-step increment, is furthermore included as the upper limit value of the normal ISO.

FIG. 4E illustrates by an example ISO sensitivity options that can be set using an ISO-AUTO range setting screen that will be described later with reference to FIG. 11E. ISO-AUTO range options are values at a first numerical value increment corresponding to a normal setting range in the case of the one step setting, but in the present embodiment, as shown in FIG. 4E, ISO 16000, which does not exist at a one-step increment (first numerical value increment), is furthermore included as a normal ISO upper limit value.

Thus, by including an ISO sensitivity that does not exist at the designated step number increment as the normal ISO upper limit value, the upper limit value of the normal setting range (ISO sensitivity setting range or ISO-AUTO range) can be set regardless of the ISO sensitivity step number setting.

ISO Sensitivity Setting Processing

Next, processing in the case where a user sets an ISO sensitivity using a menu screen will be described with reference to FIG. 5.

Note that the processing shown in FIG. 5 is realized by a software program stored in the nonvolatile memory 356 and the ISO sensitivity setting values shown in FIGS. 4A to 4E being read out to the memory 352 and executed by the system control unit 350.

When the menu button 112 is pressed by a user, thus instructing the start of display of the menu screen, the system control unit 350 displays an initial screen for the menu screen on the LCD monitor 101.

In step S501, the system control unit 350 detects whether or not selection of an ISO sensitivity setting has been performed by a user performing an operation of selecting a menu item on the main screen, and if it has been selected, the processing advances to step S502, and if not, the processing advances to step S503.

In step S502, the system control unit 350 performs "ISO sensitivity setting" screen processing and ends the processing. The details of the processing of step S502 will be described later with reference to FIG. 6.

In step S503, the system control unit 350 determines whether or not selection of the ISO sensitivity setting step has been performed, and if it has, the processing advances to step S504, and if it has not, the processing advances to step S505.

In step S504, as the processing for the "ISO sensitivity setting step" screen on which the user sets the ISO sensitivity step number setting, the system control unit 350 displays the step number setting screen shown in FIG. 11C and accepts an ISO sensitivity step number setting operation from the user. In the present embodiment, as shown in FIG. 11C, one of one-third step and one step is selectable. Upon accepting the selection operation from the user, the selected step number is stored in the nonvolatile memory 356 as the ISO sensitivity step number setting, and the present processing ends.

In step S505, the system control unit 350 determines whether or not selection of the ISO sensitivity setting range has been performed, and if it has, the processing advances to step S506, and if it has not, the processing advances to step S507.

In step S506, the system control unit 350 performs processing for the "ISO sensitivity setting range" screen, on which the range that can be set when the user sets the ISO sensitivity value is set by a user operation, and ends the processing. The details of the processing of step S506 will be described with reference to FIG. 9.

In step S507, the system control unit 350 determines whether or not selection of the ISO-AUTO range has been performed, and if it has, the processing proceeds to step S508, and if it has not, the processing proceeds to step S509.

In step S508, the system control unit 350 performs processing for the "ISO-AUTO range" screen, on which the range of setting the ISO sensitivity setting value is set by a user operation, and ends the processing. The details of the processing of step S508 will be described later with reference to FIG. 10.

In step S509, the system control unit 350 performs processing for another screen and ends the processing.

"ISO Sensitivity Setting" Screen Processing

Next, the "ISO sensitivity setting" screen processing of step S502 in FIG. 5 will be described in detail with reference to FIG. 6.

In step S601, the system control unit 350 determines whether or not the ISO sensitivity step number setting stored in the nonvolatile memory 356 (the value set in above-described step S504) is one-third step, and if it is one-third step, the processing advances to step S602, and if not, the processing advances to step S606.

In step S602, the system control unit 350 acquires the number for the current ISO value from the one-third step management data shown in FIG. 4A and sets it as a variable n stored in the memory 352. For example, when the ISO value is 400, the number is 7, and therefore 7 is set as the variable n.

In step S603, the system control unit 350 acquires the number for the lower limit value of the "ISO sensitivity setting range" from the management data shown in FIG. 4A and sets it as the lower limit number stored in the memory 352.

In step S604, the system control unit 350 acquires the number for the upper limit value of the "ISO sensitivity setting range" from the management data shown in FIG. 4A and sets it as the upper limit number stored in the memory 352.

In step S605, the system control unit 350 performs processing for displaying the one-third step ISO sensitivity setting screen. This will be described in detail later with reference to FIG. 7.

On the other hand, in step S606, the system control unit 350 acquires the number of the current ISO value from the one step management data shown in FIG. 4B and sets it as the variable n stored in the memory 352.

In step S607, the system control unit 350 acquires the number for the lower limit value of the "ISO sensitivity setting range" from the one-step management data shown in FIG. 4B and sets it as the lower limit number stored in the memory 352.

In step S608, the system control unit 350 acquires the number for the upper limit value of the "ISO sensitivity setting range" from the one step management data shown in FIG. 4B and sets it as the upper limit number stored in the memory 352.

In step S609, the system control unit 350 performs processing for displaying the one step ISO sensitivity setting screen. This will be described in detail later with reference to FIG. 8.

The following steps S610 to S622 are processes performed according to user operations.

In step S610, the system control unit 350 determines whether or not the sub-electronic dial 108 has been operated by a user, and if it has, the processing advances to step S611, and if not, the processing advances to step S622.

In step S611, the system control unit 350 determines the rotation direction of the dial, and if the rotation is counter-clockwise, the processing advances to step S612, and if it is clockwise, the processing advances to step S613.

In step S612, the system control unit 350 compares the variable n and the lower limit number, and if the lower limit number is greater than or equal to the variable n, the upper limit number is set as the variable n (step S614), and if not, 1 is subtracted from the value of the variable n (n is decremented) in step S615, and the processing advances to step S618.

In step S613, the system control unit 350 compares the variable n and the upper limit number, and if the upper limit number is less than the variable n, the lower limit number is set as the variable n (step S616), and if not, 1 is added to the value of the variable n (n is incremented) in step S617, and the processing advances to step S618.

In step S618, the system control unit 350 determines whether or not the ISO sensitivity step number setting is one-third step, and if it is, the processing advances to step S619, and if not, the processing advances to step S620.

In step S619, the system control unit 350 acquires the ISO value at the number corresponding to the variable n from the one-third step management data shown in FIG. 4A and sets it as the ISO value set using the "ISO sensitivity setting" screen in step S502.

In step S620, the system control unit 350 acquires the ISO value for the number corresponding to the variable n from the one step management data shown in FIG. 4B and sets it as the ISO value set using the "ISO sensitivity setting" screen in step S502.

In step S621, the system control unit 350 moves the focus to the ISO value set in step S619 or S620 and returns to step S610.

In step S622, the system control unit 350 determines whether or not the SET button 109 has been operated, and if the SET button 109 has been operated, the system control unit 350 finalizes the ISO value set in step S619 or S620 and ends the present processing. However, if the SET button 109 has not been operated, the processing returns to step S610.

One-Third Step ISO Sensitivity Setting Screen Display Control Processing

Next, the one-third step ISO sensitivity setting screen display control processing of step S605 in FIG. 6 will be described in detail with reference to FIG. 7.

Figure 7:
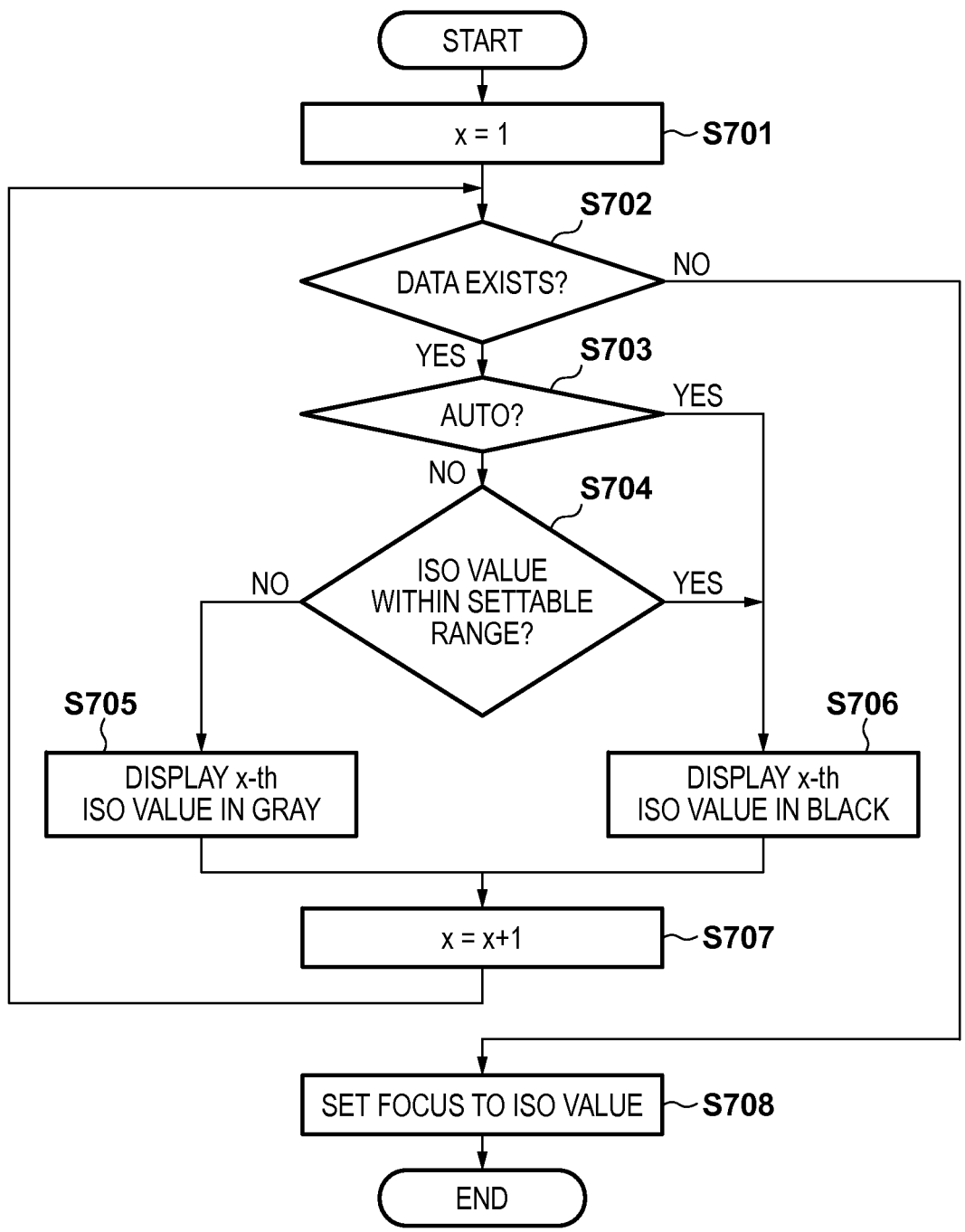
FIG. 7 is a flowchart showing details of processing of step S605 in FIG. 6.

In the processing of FIG. 7, the one-third step ISO sensitivity setting screen illustrated in FIG. 11A, which corresponds to the management data shown in FIG. 4A, is displayed.

In step S701, the system control unit 350 sets 1, which is the initial value, as a variable x stored in the memory 352.

In step S702, the system control unit 350 determines whether or not data exists in the management data No. x in FIG. 4C, which includes all ISO value options, and if the data exists, the processing advances to step S703, and if the data does not exist, or in other words, if all of the data is displayed, the processing advances to step S708.

In step S703, the system control unit 350 determines whether or not the ISO value in the management data No. x shown in FIG. 4C is AUTO, and if it is AUTO, the processing advances to step S706, and in any other case, the processing advances to step S704.

In step S704, the system control unit 350 determines whether or not the ISO value in the management data No. x shown in FIG. 4C is greater than or equal to the lower limit value and less than or equal to the upper limit value of the "ISO sensitivity setting range", and if it is in the settable range, the processing advances to step S706, and if it is outside of the settable range, the processing advances to step S705.

In step S705, the system control unit 350 displays the ISO value in the management data No. x shown in FIG. 4C in gray, which indicates to the user that it is not settable, and the processing advances to step S707.

In step S706, the system control unit 350 displays the ISO value of the management data No. x shown in FIG. 4C in black, which indicates to the user that it is settable, and the processing advances to step S707.

In step S707, the system control unit 350 adds 1 to (increments) the value of the variable x, and the processing advances to step S702.

In step S708, the system control unit 350 advances the focus to the set ISO value and ends the present processing.

One Step ISO Sensitivity Setting Screen Display Control Processing

Next, the one step ISO sensitivity setting screen display control processing of step S609 in FIG. 6 will be described in detail with reference to FIG. 8.

Figure 8:
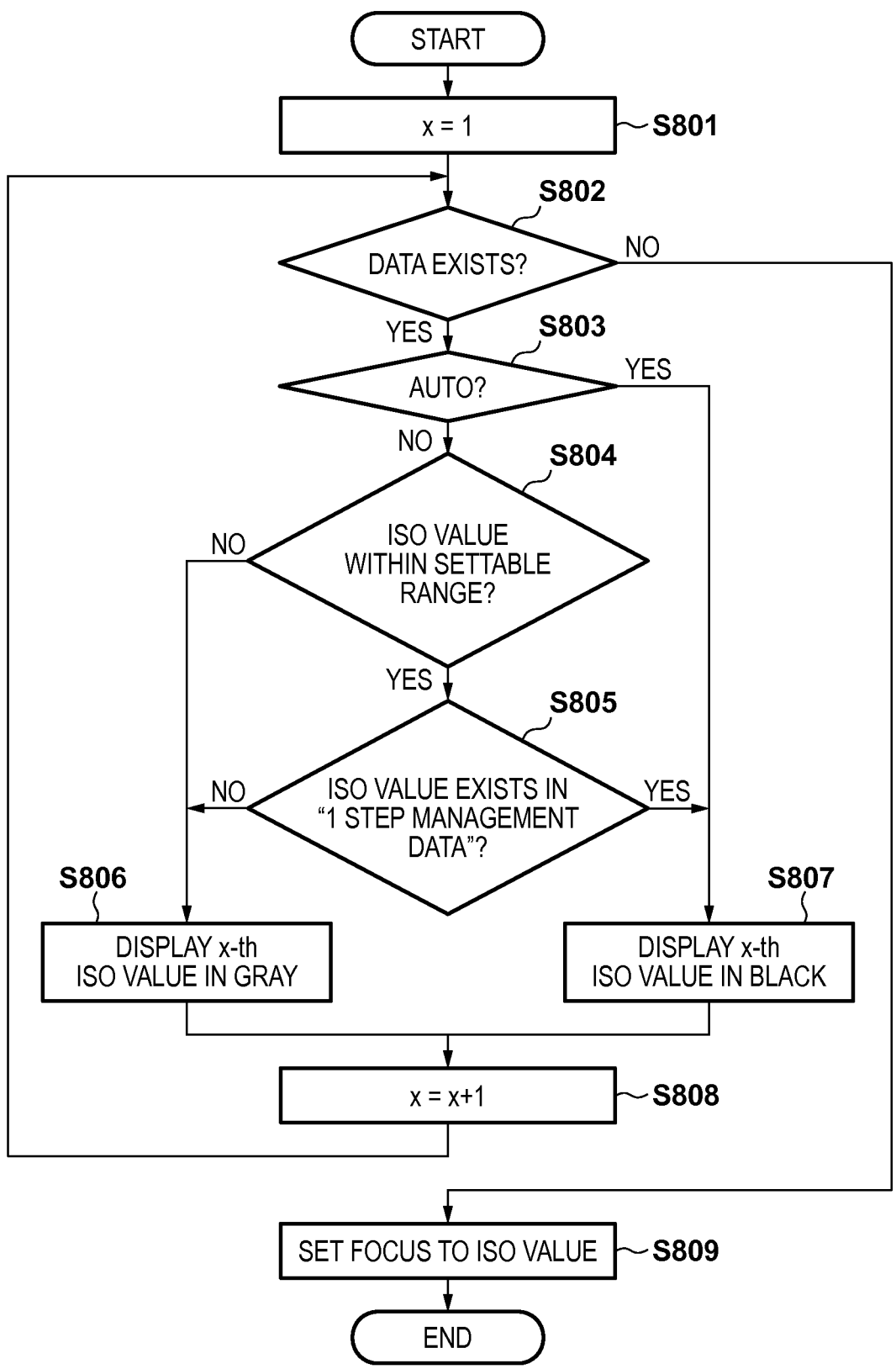
FIG. 8 is a flowchart showing details of processing of step S609 in FIG. 6.

In the processing shown in FIG. 8, the one step ISO sensitivity setting screen illustrated in FIG. 11B, which corresponds to the management data shown in FIG. 4B, is shown. With the processing shown in FIG. 8, the ISO values included in the one step management data shown in FIG. 4B are settable in the management data shown in FIG. 4C.

In FIG. 8, the processing of steps S801 to S803 is similar to that of steps S701 to S703 in FIG. 7.

In step S804, the system control unit 350 determines whether or not the ISO value in the management data No. x shown in FIG. 4C is greater than or equal to the lower limit value and less than or equal to the upper limit value of the "ISO sensitivity setting range", and if it is within the settable range, the processing advances to step S805, and if it is outside of the settable range, the processing advances to step S806.

In step S805, the system control unit 350 determines whether or not the ISO value in the management data No. x shown in FIG. 4C exists in the management data for FIG. 11B, and if it exists, the processing advances to step S807, and if not, the processing advances to step S806.

The processing of steps S806 to S809 is similar to that of steps S705 to S708 in FIG. 7.

"ISO Sensitivity Setting Range" Screen Processing

Next, the "ISO sensitivity setting range" screen processing of step S506 in FIG. 5 will be described in detail with reference to FIG. 9.

In step S901, the system control unit 350 displays a screen for setting the ISO sensitivity setting range (lower limit value 1141 and upper limit value 1142) shown in FIG. 11D.

In step S902, the system control unit 350 sets the lower limit of the ISO values in the "ISO sensitivity setting range" to a tentative lower limit value stored in the memory 352.

In step S903, the system control unit 350 sets the upper limit of the ISO values in the "ISO sensitivity setting range" to a tentative upper limit value stored in the memory 352.

In step S904, the system control unit 350 sets the "focus movement" state to a state stored in the memory 352. The states that are set are the "focus movement" and "changing" states. When the user operates the sub-electronic dial 108 during the "focus movement" state, the focus frame moves, and when the user operates the sub-electronic dial 108 during the "changing" state, the displayed upper limit value or lower limit value of the ISO values changes.

Steps S905 to S919 are processes performed based on user operations.

In step S905, the system control unit 350 determines whether or not the SET button 109 has been operated by the user, and if it has, the processing advances to step S906, and if it has not, the processing advances to step S910.

In step S906, the system control unit 350 determines whether or not the focus frame in the display is at the lower limit value 1141 or the upper limit value 1142, and if it is at the lower limit value 1141 or the upper limit value 1142, the setting state is switched from "focus movement" to "changing" (step S907), and if not, the processing advances to step S908.

In step S908, the system control unit 350 determines whether or not the focus frame in the display is at OK 1143, and if it is at OK 1143, the processing advances to the step S909, and if it is not at OK 1143, the system control unit 350 determines that the focus is at cancel 1144 and ends the present processing.

In step S909, the system control unit 350 updates the upper limit value of "ISO sensitivity setting range" using the tentative upper limit value stored in the memory 352, updates the lower limit value of "ISO sensitivity setting range" using the tentative lower limit value stored in the memory 352, and ends the present processing.

In step S910, the system control unit 350 determines whether or not the sub-electronic dial 108 was operated by the user, and if it was, the processing advances to step S911, and if it was not, the processing returns to step S905.

In step S911, the system control unit 350 determines whether or not the setting position of the sub-electronic dial 108 is in the "focus movement" state, and if it is in the "focus movement" state, the processing advances to step S919, and if not, or in other words, if it is in the "changing" state, the processing advances to step S912.

In step S919, the system control unit 350 performs focus movement processing and returns to step S905.

In step S912, the system control unit 350 determines whether or not the focus frame in the display is at the upper limit value, and if the focus is at the upper limit value, the processing advances to step S913, and if not, the processing advances to step S916.

In step S913, the system control unit 350 performs processing for updating the tentative upper limit value accompanying operation of the sub-electronic dial 108.

In step S914, the system control unit 350 determines whether or not the tentative upper limit value updated in step S913 is greater than the tentative lower limit value, and if it is greater, the processing advances to step S915, and if not, the processing returns to step S913.

In step S915, the system control unit 350 determines whether or not the tentative upper limit value updated in step S913 is less than or equal to the maximum settable value in the management data shown in FIG. 4D, and if it is less than or equal to the maximum settable value, the processing returns to step S905, and if it exceeds the maximum settable value, the processing returns to step S913.

In the above-described steps S913 to S915, the processing is performed repeatedly until the tentative upper limit value stored in the memory 352 reaches a value that can be set in the management data shown in FIG. 4D.

In step S916, the system control unit 350 performs processing for updating the tentative lower limit value accompanying operation of the sub-electronic dial 108.

In step S917, the system control unit 350 determines whether or not the tentative lower limit value updated in step S916 is smaller than the tentative upper limit value, and if it is smaller, the processing advances to step S918, and if not, the processing returns to step S916.

In step S918, the system control unit 350 determines whether or not the tentative lower limit value updated in step S916 is greater than or equal to the minimum settable value in the management data shown in FIG. 4D, and if it is greater than or equal to the minimum value, the processing returns to step S905, and if it is less than the minimum value, the processing returns to step S916.

In the above-described steps S916 to S918, the processing is executed repeatedly until the tentative lower limit value stored in the memory 352 is a settable value in the management data shown in FIG. 4D.

"ISO-AUTO Range" Screen Processing

Figure 10:
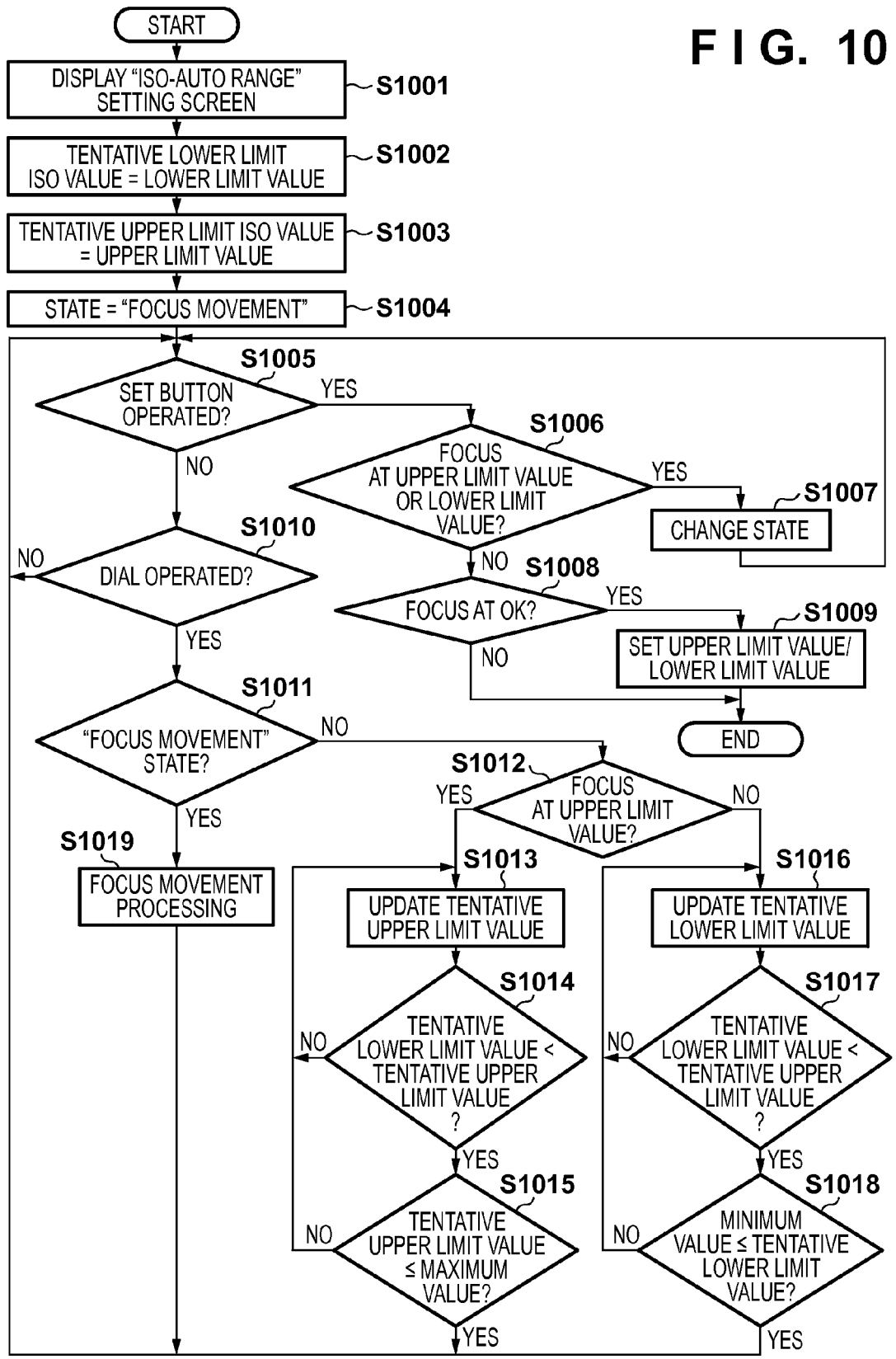
FIG. 10 is a flowchart showing details of processing of step S508 in FIG. 5.

Next, the "ISO-AUTO range" screen processing of step S508 in FIG. 5 will be described in detail with reference to FIG. 10.

In step S1001, the system control unit 350 displays a screen for setting the ISO-AUTO range (lower limit value 1151 and upper limit value 1152) shown in FIG. 11E.

In step S1002, the system control unit 350 sets the lower limit of the ISO values in the "ISO-AUTO range" to a tentative lower limit value stored in the memory 352.

In step S1003, the system control unit 350 sets the upper limit of the ISO values in the "ISO-AUTO range" to a tentative upper limit value stored in the memory 352.

Figure 9:
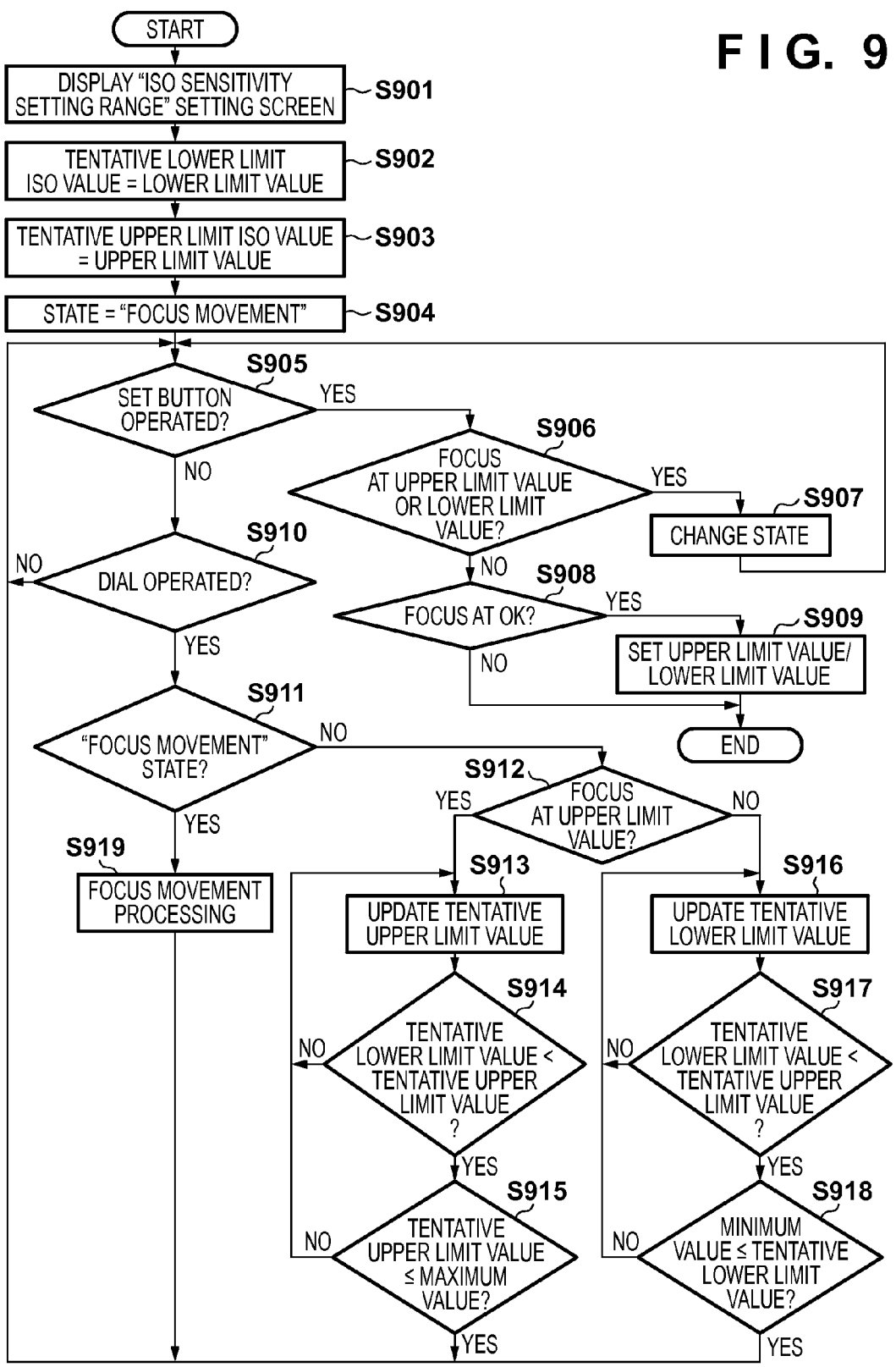
FIG. 9 is a flowchart showing details of processing of step S506 in FIG. 5.

Step S1004 is similar to step S904 in FIG. 9.

Steps S1005 to S1019 are similar to steps S905 to S919 in FIG. 9. It is sufficient that the content of the processing is read replacing the "ISO sensitivity setting range" set in FIG. 9 with "ISO-AUTO range", based on the management data for the "ISO-AUTO range" shown in FIG. 4E.

Example of Screen Display

Next, the ISO value setting screens described in FIGS. 5 to 10 will be described with reference to FIGS. 11A to 11E.

Figure 6:
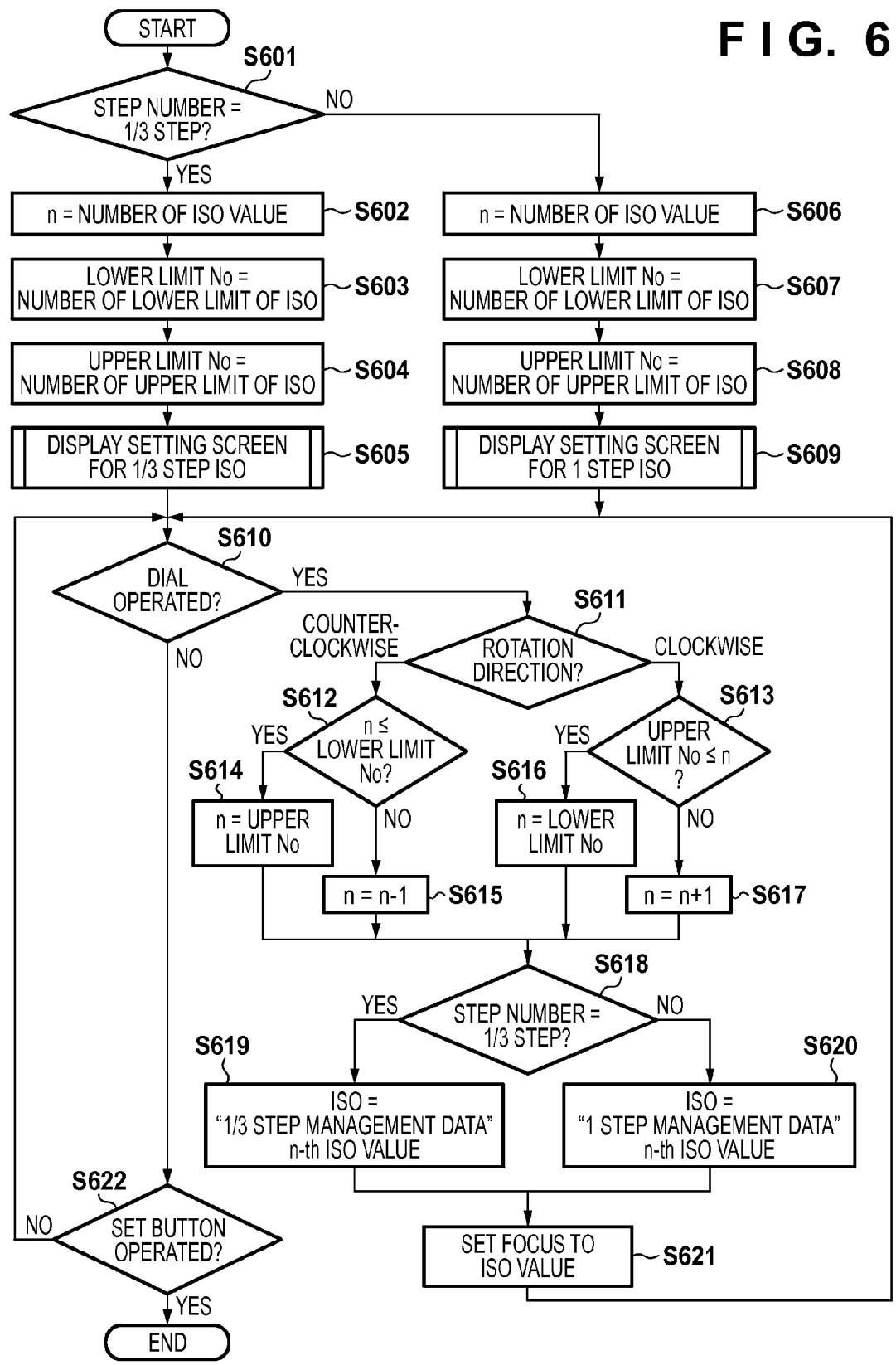
FIG. 6 is a flowchart showing details of processing of step S502 in FIG. 5.

FIG. 11A illustrates by an example a one-third step ISO setting screen displayed in step S605 of FIG. 6. Out of all of the ISO values in FIG. 4C, options corresponding to the management data shown in FIG. 4A are displayed in a settable manner.

FIG. 11B illustrates by an example the one step ISO setting screen displayed in step S609 of FIG. 6. Out of all of the ISO values in FIG. 4C, options corresponding to the one step management data shown in FIG. 4B are displayed in black 1121, which indicates that they are settable, and the other options are displayed in a different display appearance such as gray 1122, which indicates that they are not settable. Here, ISO 16000, which does not exist in the normal setting range options, is included as the upper limit value for the normal ISO in the settable options shown in FIG. 11B.

FIG. 11C illustrates by an example the ISO sensitivity step number setting screen displayed in step S504 of FIG. 5. With the step number setting screen, one of one-third step (1131) for setting the one-third step ISO sensitivity shown in FIG. 11A and one step (1132) for setting the one step ISO sensitivity shown in FIG. 11B is displayed selectably.

FIG. 11D illustrates by an example the screen for setting the ISO sensitivity setting range, which is displayed in step S506 of FIG. 5. The lower limit value 1141 and the upper limit value 1142 are displayed changeably within the range of options corresponding to the management data shown in FIG. 4D, regardless of the ISO sensitivity step number setting. In the screen shown in FIG. 11B, options for values smaller than the lower limit value 1141 and for values greater than the upper limit value 1142 are displayed in gray, which indicates that they are not selectable, as with numerical value 1122. In this way, on the screen shown in FIG. 11D, regardless of the ISO sensitivity step number setting, the upper limit value for the ISO sensitivity normal setting range is settable, and the ISO sensitivity setting can be easily changed. Note that in the present embodiment, only the upper limit value has been mentioned, but if the lower limit value exists in the normal setting range in the case of the one step setting, a configuration may be used in which it can be selected from among the options for the one step setting, similarly to the upper limit value.

FIG. 11E illustrates by an example the ISO-AUTO range setting screen displayed in step S508 of FIG. 5. The lower limit value 1151 and the upper limit value 1152 are automatically set within the range of options corresponding to the management data shown in FIG. 4E, and are displayed changeably.

As described above, according to the present embodiment, the upper limit value of the ISO sensitivity normal setting range is included in the options, regardless of the ISO sensitivity step number setting. Accordingly, the user can set the desired upper limit value of the ISO sensitivity regardless of the ISO sensitivity step number setting.

Note that in the above-described embodiment, a case was described in which the step number setting was in one-third-step increments or one-step increments, but even in the case of another step number setting (e.g., half-step increments, or the like), similar effects can be obtained by including the upper limit value and the lower limit value of the normal setting range in the options.

Note that a single item of hardware may control the system control unit 350, or the entire apparatus may be controlled by a plurality of items of hardware sharing processing.

Although the present invention has been elaborated above based on suitable embodiments thereof, the present invention is by no means limited to these specific embodiments and includes various modifications without departing from the concept of the present invention. The above embodiments are merely illustrative embodiments of the present invention, and may be combined where appropriate.

Although the above embodiments have described an example in which the present invention is applied to an image capturing apparatus such as a digital camera, the present invention is not limited to this example. The present invention is applicable to, for example, an apparatus having an image sensor capable of setting a range of ISO sensitivity. More specifically, the present invention is applicable to a tablet, a smart phone which is a kind of a mobile telephone terminal, a PDA (Personal Digital Assistant), a mobile image viewer, a game console, an electronic book reader, and the like.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-187033, filed Sep. 12, 2014 which is hereby incorporated by reference herein in its entirety.

What is claimed is:

1. An image capturing apparatus comprising:
an image capture unit; and
at least one processor or circuit to perform the operations of the following units:
a setting unit configured to set a sensitivity serving as a setting for shooting using the image capture unit; and
a selection unit configured to be able to select one of a first selection method capable of selecting a sensitivity from out of a plurality of sensitivities at a first numerical value increment, and a second selection method capable of selecting a sensitivity from out of a plurality of sensitivities at a second numerical value increment, as a method for selecting the sensitivity, the second numerical value being smaller than the first numerical value,
wherein options selectable with the first selection method include a predetermined sensitivity that does not correspond to the first numerical value increment and is selectable with the second selection method.

2. The apparatus according to claim 1, further comprising:
a storage unit storing each of a plurality of options selectable with the first selection method, and a plurality of options selectable with the second selection method.

3. The apparatus according to claim 1, wherein
the setting unit performs setting to a sensitivity selected by the selection unit.

4. The apparatus according to claim 1, further comprising
at least one processor or circuit to perform the operations of:
a display control unit configured to perform control such that when performing selection using the first selection method, an option selectable with the first selection method and an option selectable with the second selection method but not with the first selection method are displayed.

5. The apparatus according to claim 4, wherein
the display control unit performs control such that the option selectable with the first selection method and the option selectable with the second selection method but not with the first selection method are displayed using different display appearances.

6. The apparatus according to claim 1, wherein
the setting unit is capable of setting the upper limit value and the lower limit value of an automatically-selected sensitivity with the first selection method or the second selection method selected by the selection unit.

7. The apparatus according to claim 1, wherein the first numerical value increment is a one-step increment, and the second numerical value increment is one of a half-step increment and a one-third-step increment.

8. The apparatus according to claim 1, wherein
the predetermined sensitivity is one of the upper limit and the lower limit of normal sensitivity that does not include an expanded sensitivity.

9. A control method of an image capturing apparatus comprising an image capture unit, the method comprising:
a setting step of setting a sensitivity serving as a setting for shooting using the image capture unit; and
a selection step of being able to select one of a first selection method capable of selecting a sensitivity from out of a plurality of sensitivities at a first numerical value increment, and a second selection method capable of selecting a sensitivity from out of a plurality of sensitivities at a second numerical value increment, as a method for selecting the sensitivity, the second numerical value being smaller than the first numerical value,
wherein options selectable with the first selection method include a predetermined sensitivity that does not correspond to the first numerical value increment and is selectable with the second selection method.

10. A non-transitory computer-readable storage medium storing a program for causing a computer to function as an image capture unit, a setting unit and a selection unit of an image capturing unit, wherein the setting unit sets a sensitivity serving as a setting for shooting using the image capture unit, and the selection unit is able to select one of a first selection method capable of selecting a sensitivity from out of a plurality of sensitivities at a first numerical value increment, and a second selection method capable of selecting a sensitivity from out of a plurality of sensitivities at a second numerical value increment, as a method for selecting the sensitivity, the second numerical value being smaller than the first numerical value, options selectable with the first selection method include a predetermined sensitivity that does not correspond to the first numerical value increment and is selectable with the second selection method.

* * * * *